(12) United States Patent
Xu et al.

(10) Patent No.: US 12,317,337 B2
(45) Date of Patent: May 27, 2025

(54) RANDOM ACCESS METHOD AND DEVICE

(71) Applicant: GUANGDONG OPPO MOBILE TELECOMMUNICATIONS CORP., LTD., Dongguan (CN)

(72) Inventors: Jing Xu, Dongguan (CN); Zuomin Wu, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 413 days.

(21) Appl. No.: 17/478,678

(22) Filed: Sep. 17, 2021

(65) Prior Publication Data
US 2022/0007436 A1    Jan. 6, 2022

Related U.S. Application Data

(63) Continuation of application No. PCT/CN2019/079767, filed on Mar. 26, 2019.

(51) Int. Cl.
*H04W 74/08* (2024.01)
*H04W 72/04* (2023.01)
*H04W 72/044* (2023.01)
*H04W 72/12* (2023.01)
*H04W 72/1263* (2023.01)
*H04W 74/00* (2009.01)
*H04W 74/0833* (2024.01)

(52) U.S. Cl.
CPC ... *H04W 74/0841* (2013.01); *H04W 72/0466* (2013.01); *H04W 72/1263* (2013.01); *H04W 74/006* (2013.01)

(58) Field of Classification Search
CPC .......... H04W 74/0841; H04W 74/006; H04W 74/0833; H04W 72/0466; H04W 72/1263; H04W 72/23
USPC .................................................. 370/329–330
See application file for complete search history.

(56) References Cited

U.S. PATENT DOCUMENTS

| 11,337,078 B2 * | 5/2022 | Niu .................... H04W 74/0833 |
| 2007/0165567 A1 | 7/2007 | Tan et al. |
| 2018/0124822 A1 | 5/2018 | Wang et al. |

(Continued)

FOREIGN PATENT DOCUMENTS

| CN | 108617001 A | 10/2018 |
| CN | 108924829 A | 11/2018 |

OTHER PUBLICATIONS

Extended European Search Report dated Feb. 15, 2022 received in European Patent Application No. EP 19921634.2.

(Continued)

*Primary Examiner* — Candal Elpenord
(74) *Attorney, Agent, or Firm* — Sheppard, Mullin, Richter & Hampton LLP

(57) ABSTRACT

The embodiments of the present disclosure provide a random access method and device, and provide a method for data transmission for a terminal device that performs random access using a two-step random access procedure. The method includes: transmitting, by a terminal device, a first preamble and first uplink data to a network device; receiving, by the terminal device, scheduling information transmitted by the network device; and performing, by the terminal device, a subsequent transmission according to the scheduling information.

20 Claims, 4 Drawing Sheets

(56) References Cited

U.S. PATENT DOCUMENTS

| | | | | |
|---|---|---|---|---|
| 2018/0324869 | A1* | 11/2018 | Phuyal | H04W 74/0833 |
| 2019/0159197 | A1* | 5/2019 | Shrestha | H04W 72/21 |
| 2019/0230685 | A1* | 7/2019 | Park | H04L 5/0094 |
| 2020/0187245 | A1* | 6/2020 | Fujishiro | H04W 74/0833 |
| 2021/0007148 | A1* | 1/2021 | Selvaganapathy | H04W 72/23 |
| 2021/0112590 | A1* | 4/2021 | Kim | H04W 74/008 |
| 2021/0195648 | A1* | 6/2021 | Wong | H04W 74/0833 |

OTHER PUBLICATIONS

ZTE et al: "Considerations on 2-Step RACH Procedures" ,3GPP Draft; R1-1901627 , 3rd Generation Partnership Project (3GPP) , Mobile Competence Centre ; 650 , Route Des Lucioles ; F-06921 Sophia-Antipolis Cedex; France , Feb. 16, 2019 (Feb. 16, 2019) , XP051599324.

International Search Report and Written Opinion date Dec. 30, 2019 in International Application PCT/CN2019/079767. English translation attached.

* cited by examiner

RANDOM ACCESS METHOD AND DEVICE

CROSS-REFERENCE TO RELATED APPLICATIONS

The present application is a continuation of International Application No. PCT/CN2019/079767 filed on Mar. 26, 2019, which is hereby incorporated by reference in its entirety.

TECHNICAL FIELD

The embodiments of the present disclosure relates to the field of communication technology, and more particularly, to a random access method and device.

BACKGROUND

Random access is one of the most fundamental functions of a cellular system. It enables a terminal device to establish a communication connection with a network device. In the New Radio (NR) system (or the $5^{th}$ Generation (5G) system or 5G network), a four-step random access procedure similar to the one used in Long Term Evolution (LTE) is adopted. However, the traditional four-step random access procedure has a relatively high signaling overhead.

Therefore, in order to reduce the signaling overhead, a two-step random access procedure has been proposed. However, how to transmit data based on the two-step random access procedure is a problem to be solved.

SUMMARY

The embodiments of the present disclosure provide a random access method and device, and provide a method for data transmission for a terminal device that performs random access using a two-step random access procedure.

In a first aspect, a random access method is provided. The method includes: transmitting, by a terminal device, a first preamble and first uplink data to a network device; receiving, by the terminal device, scheduling information transmitted by the network device; and performing, by the terminal device, a subsequent transmission according to the scheduling information.

In a second aspect, a random access method is provided. The method includes: detecting, by a network device, a first preamble and first uplink data transmitted by a terminal device; transmitting, by the network device, scheduling information to the terminal device according to a reception situation of the first uplink data; and performing, by the network device, a subsequent transmission according to the scheduling information.

In a third aspect, a terminal device is provided. The terminal device is configured to perform the method according to the above first aspect or any optional embodiments thereof. In particular, the terminal device includes functional units for performing the method according to the above first aspect or any optional embodiments thereof.

In a fourth aspect, a network device is provided. The network device is configured to perform the method according to the above second aspect or any optional embodiments thereof. In particular, the network device includes functional units for performing the method according to the above second aspect or any optional embodiments thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any embodiments thereof.

In a sixth aspect, a network device is provided. The network device includes a processor and a memory. The memory is configured to store a computer program, and the processor is configured to invoke and execute the computer program stored in the memory to perform the method according to the above second aspect or any embodiments thereof.

In a seventh aspect, an apparatus for implementing the method according to the above first aspect or any optional embodiments thereof is provided. In particular, the apparatus includes a processor. The processor is configured to invoke and execute a computer program from a memory to cause a device provided with the apparatus to perform the method according to the above first aspect or any optional embodiments thereof.

In an eighth aspect, an apparatus for implementing the method according to the above second aspect or any optional embodiments thereof is provided. In particular, the apparatus includes a processor. The processor is configured to invoke and execute a computer program from a memory to cause a device provided with the apparatus to perform the method according to the above second aspect or any optional embodiments thereof.

In a ninth aspect, a computer-readable storage medium is provided. The computer-readable storage medium is configured to store a computer program that causes a computer to perform the method according to the above first aspect or any optional embodiments thereof.

In a tenth aspect, a computer-readable storage medium is provided. The computer-readable storage medium is configured to store a computer program that causes a computer to perform the method according to the above second aspect or any optional embodiments thereof.

In an eleventh aspect, a computer program product is provided. The computer program product includes computer program instructions that cause a computer to perform the method according to the above first aspect or any optional embodiments thereof.

In a twelfth aspect, a computer program product is provided. The computer program product includes computer program instructions that cause a computer to perform the method according to the above second aspect or any optional embodiments thereof.

In a thirteenth aspect, a computer program is provided. The computer program, when executed on a computer, causes the computer to perform the method according to the above first aspect or any optional embodiments thereof.

In a fourteenth aspect, a computer program is provided. The computer program, when executed on a computer, causes the computer to perform the method according to the above second aspect or any optional embodiments thereof.

With the solutions according to the embodiments of the present disclosure, when a terminal device selects a two-step random access procedure for random access, it can transmit a first preamble and first uplink data to a network device. The network device can transmit different scheduling information to the terminal device based on a reception situation of the first uplink data. The terminal device can perform different transmissions with the network device according to the scheduling information. By transmitting the scheduling information, the flexibility of transmissions between the terminal device and the network device can be improved.

DESCRIPTION OF EMBODIMENTS

The technical solutions in the embodiments of the present disclosure will be described below with reference to the figures.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Networks (WLAN), Wireless Fidelity (WiFi), the next generation communication system, or other communication systems.

The embodiments of the present disclosure are not limited to any applicable frequency spectrum. For example, the embodiments of the present disclosure can be applied to licensed spectrum or unlicensed spectrum.

Figure 1:
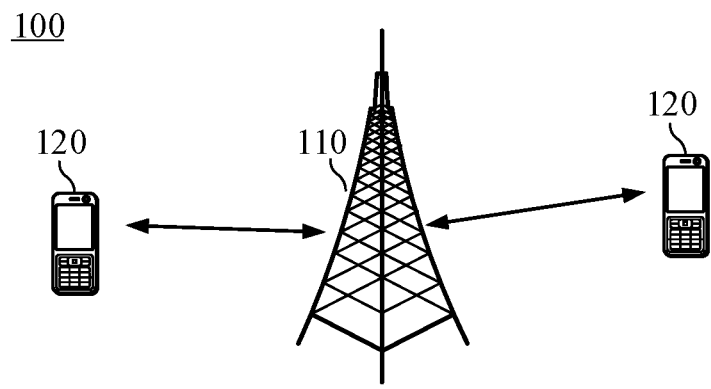
FIG. 1 is a schematic diagram showing a wireless communication system in which an embodiment of the present disclosure can be applied.

A wireless communication system 100 where an embodiment of the present disclosure can be applied is shown in FIG. 1. The wireless communication system 100 may include a network device 110. The network device 110 may be a device that can communicate with a terminal device. The network device 110 may provide communication coverage for a particular geographic area, and may communicate with terminal devices (e.g., User Equipments, or UEs) located in the coverage area. Optionally, the network device 110 may be a base station such as Base Transceiver Station (BTS) in a GSM system or a CDMA system, a base station such as NodeB (NB) in a WCDMA system, a base station such as Evolutional Node B (eNB or eNodeB) in an LTE system or an NR system, or a radio controller in a Cloud Radio Access Network (CRAN). Alternatively, the network device 110 may be a relay station, an access point, a vehicle-mounted device, a wearable device, a network side device in a 5G network, or a network device in a future evolved Public Land Mobile Network (PLMN), etc.

The wireless communication system 100 further includes at least one terminal device 120 located within the coverage range of the network device 110. The terminal device 120 may be mobile or fixed. Optionally, the terminal device 120 may be an access terminal, a User Equipment (UE), a user unit, a user station, a mobile station, a mobile terminal, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a future 5G network, or a terminal device in a future evolved PLMN, etc. Optionally, direct communication, such as Device to Device (D2D) communication, may be performed between the terminal devices 120.

Optionally, the 5G system or network may also be referred to as an NR system or network.

FIG. 1 exemplarily shows one network device and two terminal devices. Optionally, the wireless communication system 100 may include multiple network devices, and the coverage of each network device may include other numbers of terminal devices. The embodiments of the present disclosure are not limited to these examples.

Optionally, the wireless communication system 100 can further include other network entities such as Access and Mobility Management Function (AMF), Session Management Function (SMF), Unified Data Management (UDM), Authentication Server Function (AUSF), etc. The embodiments of the present disclosure are not limited to these examples.

In addition, various aspects or features of the present disclosure can be implemented as methods, devices, or manufactures using standard programming and/or engineering techniques. The term "manufacture" as used herein refers to a computer program accessible from any computer-readable device, carrier, or medium. For example, a computer-readable medium may include, but not limited to: a magnetic storage device (for example, hard disk, floppy disk, or tape, etc.), an optical disc (for example, Compact Disc (CD), Digital Versatile Disc (DVD), etc.), a smart card, or a flash memory device (for example, Erasable Programmable Read-Only Memory (EPROM), card, stick, or key drive, etc.). In addition, various storage mediums described herein may represent one or more devices and/or other machine-readable mediums for storing information. The term "machine-readable medium" may include, but not limited to, any of various mediums capable of storing, containing, and/or carrying instructions and/or data.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

Figure 2:
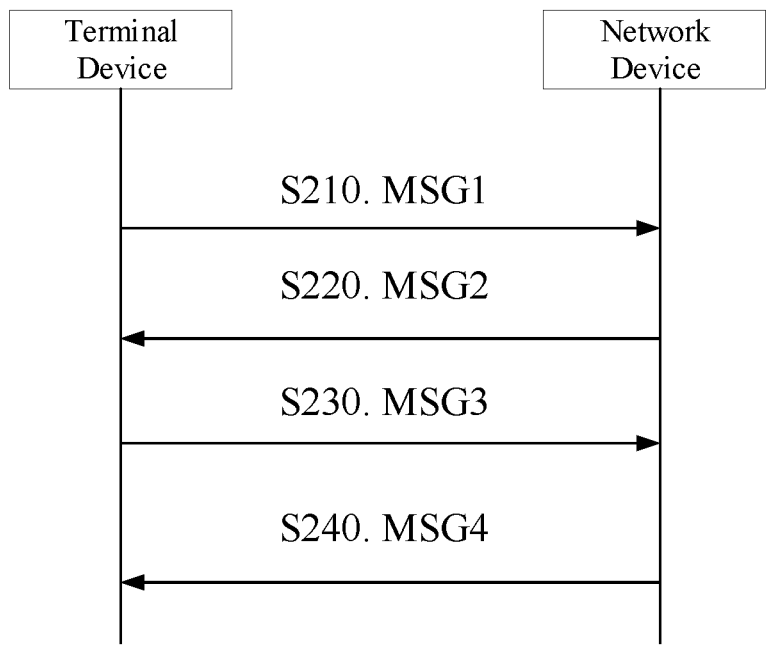
FIG. 2 is a schematic diagram showing a four-step random access procedure according to an embodiment of the present disclosure.

Typically, a terminal device can perform uplink transmission only after synchronized with a network device in a random access procedure. Currently, the random access procedure typically uses a contention-based four-step random access procedure. The four-step random access procedure will be described below with reference to FIG. 2. The method includes steps S210-S240.

It is to be noted that, while the embodiments of the present disclosure are described with reference to contention-based random access only as an example, but the present disclosure is not limited to this. The embodiments of the present disclosure may also be applied to non-contention-based random access.

At S210, the terminal device selects a Physical Random Access Channel (PRACH) resource, e.g., as at least one of a time domain resource, a frequency domain resource, and a code domain resource for PRACH.

The terminal device transmits a message 1 (MSG1) to the network device on the selected PRACH resource, and the MSG1 contains a random access preamble selected by the terminal device.

The network device can estimate uplink transmission time based on the preamble transmitted by the terminal device, and a size of an uplink resource required for the terminal device to transmit an MSG3 at step S230.

At S220, after receiving the MSG1, the network device transmits an MSG2 on a Downlink Share Channel (DL-SCH). Here, the MSG2 is a Random Access Response (RAR).

Here, the RAR carries a Timing Advance (TA) of uplink transmission, information on available uplink resources, and a Temporary Cell Radio Network Temporary Identifier (T-CRNTI), i.e., temporary CRNTI.

Optionally, the RAR may be generated at a Media Access Control (MAC) layer of the network device, and the RAR generated at the MAC layer may also be referred to as an MAC RAR. One MSG2 may correspond to random access requests from more than one terminal device simultaneously.

For the terminal device, after transmitting the MSG1, the terminal device can create an RAR window and monitor a Physical downlink control channel (PDCCH) in the RAR window.

The PDCCH is a PDCCH scrambled with a Random Access RNTI (RA-RNTI), where the RA-RNTI is calculated as follows:

$$RA\text{-}RNTI = 1 + s\_id + 14 \times t\_id + 14 \times 80 \times f\_id + 14 + 80 \times 8 \times ul\_carrier\_id \qquad (1),$$

where s_id represents an index of the first symbol of the PRACH opportunity, t_id represents an index of the first subframe for transmitting the PRACH, fid represents a frequency domain position index of the first subframe, and ul_carrier_id represents a type of an uplink carrier for transmitting a random access preamble (0 represents an uplink carrier, and 1 represents a supplementary uplink carrier).

It can be seen from above that the RA-RNTI is associated with the PRACH time-frequency resource selected by the terminal device. Both the terminal device and the network device can determine the RA-RNTI based on the PRACH time-frequency resource. The network device can scramble the PDCCH with the determined RA-RNTI, and transmit the scrambled PDCCH to the terminal device. The terminal device can decode the PDCCH transmitted by the network device based on the determined RA-RNTI.

After the PDCCH scrambled with the RA-RNTI is successfully monitored, the terminal device obtains a Physical Downlink Shared Channel (PDSCH) scheduled by the PDCCH according to the PDCCH. The PDSCH may include an RAR, and the format of the RAR may be as shown in FIGS. 3-6.

The MAC RAR can be carried in an MAC Protocol Data Unit (PDU). The structure of the MAC PDU may include three parts: an MAC header having a variable size, an RAR payload which may include one or more MAC RARs, and padding information, which is optional.

Figure 3:
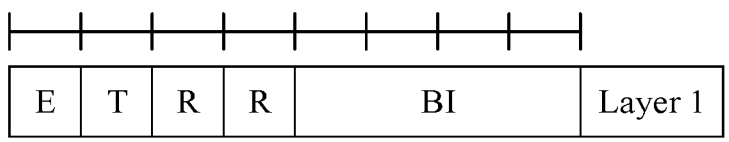
FIG. 3 is a schematic diagram showing a structure of an RAR format according to an embodiment of the present disclosure.
Figure 4:
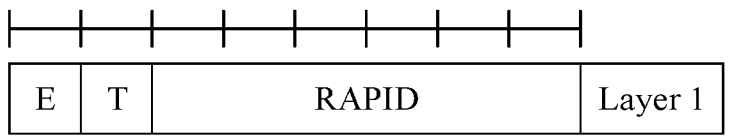
FIG. 4 is a schematic diagram showing a structure of another RAR format according to an embodiment of the present disclosure.

One MAC header may include one or more MAC sub-headers. The MAC header may include two types of sub-headers, as shown in FIG. 3 and FIG. 4. FIG. 3 and FIG. 4 are schematic diagrams showing the two types of MAC sub-headers, respectively. These two types of sub-headers can be distinguished from each other by a type field "T". T=0 can indicate that a random access Back-off Indicator "BI" is presented next. As shown in FIG. 3, the BI can indicate back-off time for retransmitting the MSG1. T=1 can indicate that a Random Access Preamble Identity is presented next, as shown in FIG. 4.

Among the fields in the MAC sub-header, the field "E" represents an extension field indicating whether there is a subsequent MAC sub-header. When E=1, it means that there is a following MAC sub-header. When E=0, it means that there is no following MAC sub-header. The field "T" represents a type field indicating whether a "BI" or a "RAPID" is presented next. When T=1, it means that a RAPID field is presented next, and when T=0, it means that a BI field is presented next. Here, the RAPID is the network device's response to the preamble in the received MSG1, and the value of the RAPID may be the value of the preamble transmitted by the terminal device to the network device. The field "BI" represents a back-off indicator indicating the back-off time for retransmitting MSG1.

Figure 5:
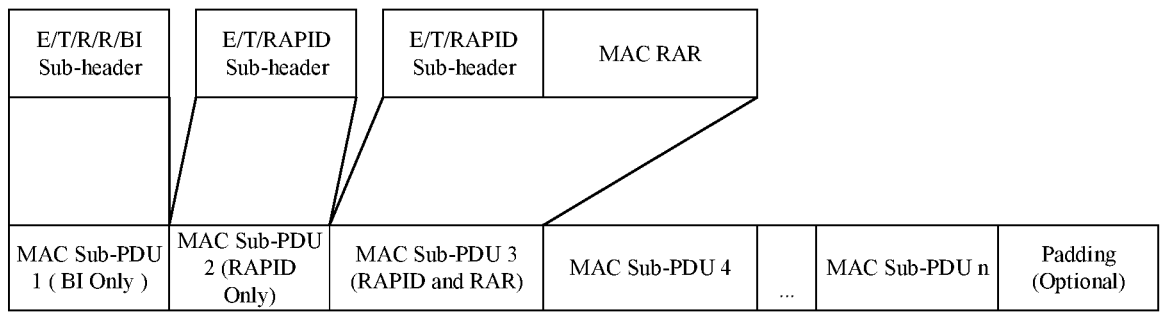
FIG. 5 is a schematic diagram showing a structure of an MAC PDU according to an embodiment of the present disclosure.

FIG. 5 is a schematic diagram showing a structure of an MAC PDU including an MAC RAR. FIG. 5 shows a case where an MAC header includes a plurality of MAC sub-headers. Of course, one MAC header may alternatively include one MAC sub-header.

Figure 6:
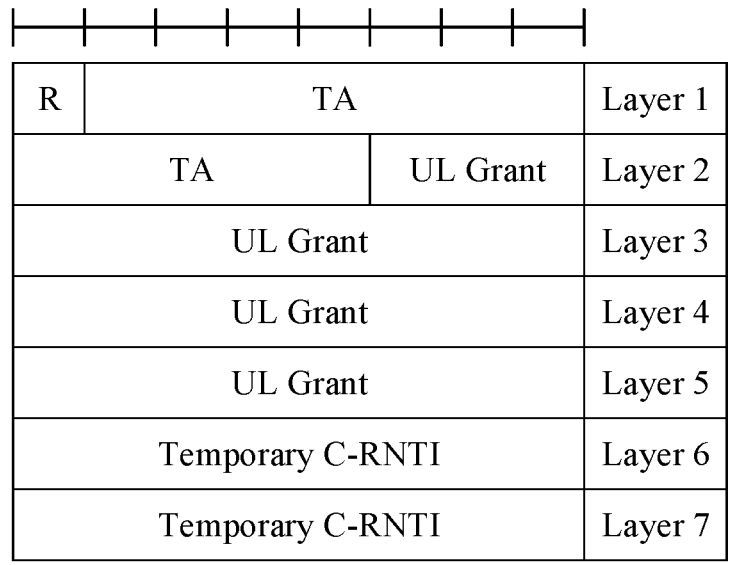
FIG. 6 is a schematic diagram showing a structure of yet another RAR format according to an embodiment of the present disclosure.

If a certain RAR is of a RAPID type, the structure of the RAR can be as shown in FIG. 6. Here, the field "R" is a reserved bit, which is always filled with 0. The RAR may include at least one of the following information: an uplink timing advance, uplink grant (UL grant) information, and a temporary C-RNTI. The uplink grant information indicates an uplink resource available for the terminal device to transmit the MSG. The uplink timing advance is used for adjusting the uplink timing for the terminal device to transmit uplink data. The temporary C-RNTI is used for scrambling the PDCCH in the MSG4.

The uplink grant information may include at least one of the following information: frequency hopping information, a Physical Uplink Shared Channel (PUSCH) frequency domain resource, a PUSCH time domain resource, a Modulation and Coding Scheme (MCS), a Transmit Power Control (TPC) command for PUSCH, and a Channel State Information (CSI) request. The number of bits occupied by each of the above information is shown in Table 1.

TABLE 1

| RAR Grant Field | No. of Bits |
| --- | --- |
| Frequency Hopping | 1 |
| PUSCH Frequency Domain Resource | 14 |
| PUSCH Time Domain Resource | 4 |
| MCS | 4 |
| TPC Command For PUSCH | 3 |
| CSI Request | 1 |

According to the current specification, the frequency hopping information occupies 1 bit, the PUSCH frequency domain resource occupies 14 bits, the PUSCH time domain resource occupies 4 bits, the MCS occupies 4 bits, the TPC command for PUSCH occupies 3 bits, and the CSI request occupies 1 bit.

Table 2 shows a correspondence between TPC commands and power adjustment information.

TABLE 2

| Bit Value of TPC Command | Power Adjustment Value (dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

The bit value of the TPC command indicates the value of the 3 bits occupied by the TPC command. When the bit value of the TPC command is 0, it means that the transmit power of PUSCH needs to be adjusted by −6 dB. When the bit value of the TPC command is 1, it means that the transmit power of PUSCH needs to be adjusted by −4 dB. When the bit value of the TPC command is 2, it means that the transmit power of PUSCH needs to be adjusted by −2 dB. When the bit value of the TPC command is 3, it means that the transmit power of PUSCH needs to be adjusted by 0 dB. When the bit value of the TPC command is 4, it means that the transmit power of PUSCH needs to be adjusted by 2 dB. When the bit value of the TPC command is 5, it means that the transmit power of PUSCH needs to be adjusted by 4 dB. When the bit value of the TPC command is 6, it means that the transmit power of PUSCH needs to be adjusted by 6 dB. When the bit value of the TPC command is 7, it means that the transmit power of PUSCH needs to be adjusted by 8 dB.

At S230, after receiving the MSG2, the terminal device determines whether the MSG2 is an RAR message for itself. After determining that the MSG2 is the RAR message for itself, an MSG3 message can be transmitted on the available uplink resource indicated by the network device, and the MSG3 message may be a Radio Resource Control (RRC) message.

The MSG3 message can carry an RNTI specific to the terminal device.

The main function of the MSG3 message is to inform the network device of what event triggered the random access procedure. For example, if the random access procedure is an initial random access procedure, the MSG3 message may carry a terminal device identifier and an establishment event which may be, for example, an RRC connection request message. In another example, in an RRC connection reestablishment process, the MSG3 message may carry the terminal device identifier in a connected state and an establishment event which may be, for example, an RRC connection reestablishment process.

In addition, the terminal device identifier carried in the MSG3 can be used to determine whether the contention is successful in an MSG4.

At S240, the terminal device receives an MSG4 transmitted by the network device. The MSG4 can also be referred to as a contention resolution message, which can be used to determine whether the contention is successful. The MSG4 may also include an uplink resource allocated by the network device to the terminal device. When the terminal device identifier carried in the MSG4 is consistent with the terminal device identifier transmitted by the terminal device to the network device in the MSG3, it indicates that the random access is successful and the terminal device can perform uplink transmission on the uplink resource indicated in the MSG4. When the terminal device identifier carried in the MSG4 is inconsistent with the terminal device identifier transmitted by the terminal device to the network device in the MSG3, it means that the random access by the terminal device has failed. After the random access fails, the terminal device can perform the steps of S210-S240 again to re-initiate random access.

The MSG4 has two functions: one for indicating to the terminal device whether the contention for the random access is successful, and the other for transmitting an RRC configuration message to the terminal device.

However, the conventional four-step random access procedure requires four signaling interactions between the terminal device and the network device for successful access. The four-step random access procedure may cause high signaling overhead and high access delay.

Therefore, in order to save signaling overhead and reduce access delay, a two-step random access procedure has been proposed. In the two-step random access procedure, briefly speaking, it is equivalent to combining the first and third steps in the four-step random access procedure into a first step in the two-step random access procedure, and combining the second and fourth steps in the four-step random access procedure into a second step in the two-step random access procedure.

Figure 7:
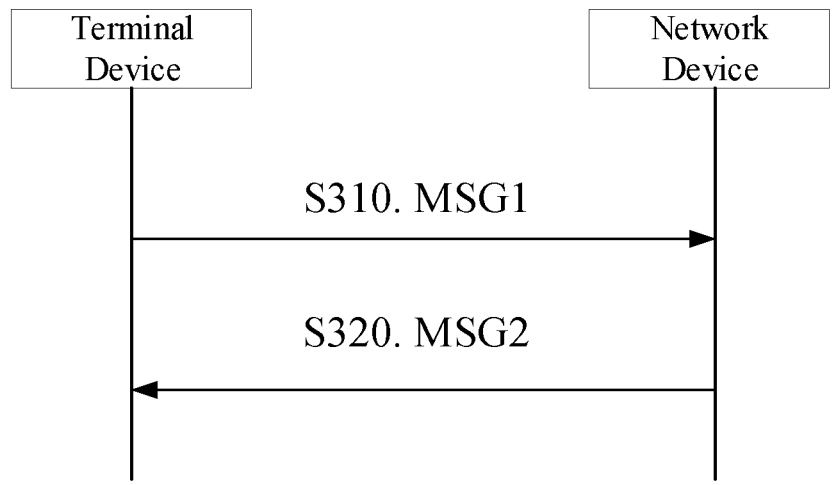
FIG. 7 is a schematic diagram showing a two-step random access procedure according to an embodiment of the present disclosure.

The two-step random access procedure will be described below with reference to FIG. 7.

At step S710, a terminal device transmits an MSGA to a network device. The MSGA includes a random access preamble, uplink data, and a terminal device identifier.

The uplink data can be carried on a PUSCH. Here, the PUSCH may carry an RNTI specific to the terminal device.

Optionally, the content of the uplink data may be different depending on different random access scenarios. For example, in the case of random access initiated for initial access, the uplink data may include an RRC connection request message. In another example, in the case of random access initiated for RRC connection reestablishment, the uplink data may include an RRC connection reestablishment request message.

The uplink data may alternatively be uplink information carried in a PDCCH.

Optionally, the random access preamble may be a preamble randomly selected by the terminal device. For example, the preamble may be one of a plurality of preambles provided by the network device.

At step S720, the network device transmits an MSGB to the terminal device.

The MSGB may include an RAR and a contention resolution message.

In the four-step random access procedure, the MSG3 supports Hybrid Automatic Repeat reQuest (HARD) based retransmission. That is, the network device can schedule retransmission of the MSG3 using a UL grant having Cyclic Redundancy Check (CRC) scrambled with a temporary C-RNTI. However, for the two-step random access procedure, as the MSGA includes the MSG1 and the MSG3 in the four-step random access procedure, whether the payload of the MSGA supports HARQ-based retransmission, how to perform retransmission if the HARQ-based retransmission is supported, and how to transmit data between the terminal device and the network device, these problems remain unsolved in the current specification.

Figure 8:
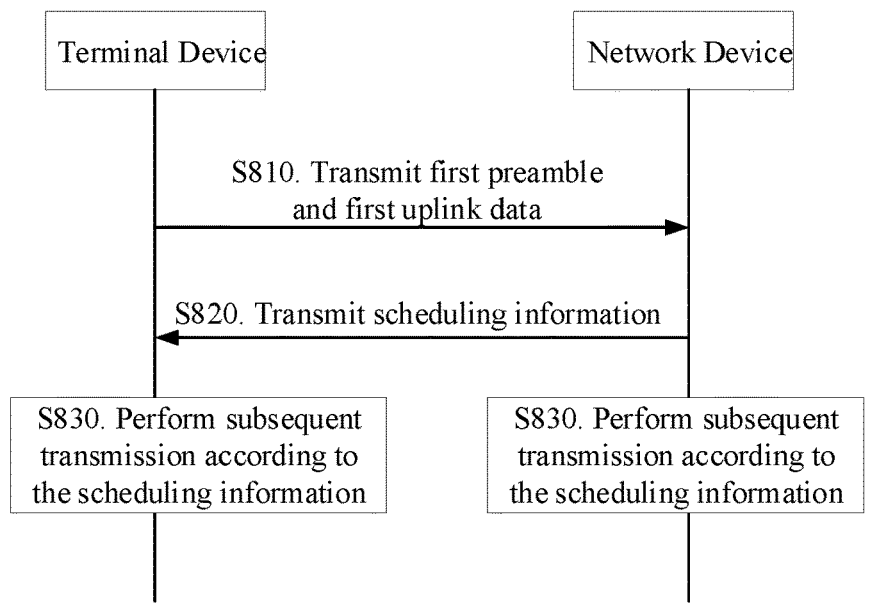
FIG. 8 is a schematic flowchart illustrating a random access method according to an embodiment of the present disclosure.

An embodiment of the present disclosure provides a random access method, and provides a data transmission method based on two-step random access. As shown in FIG. 8, the method includes steps S810 to S830.

At S810, a terminal device transmits a first preamble and first uplink data to a network device. The content transmitted by the terminal device to the network device can be the same as the content of the MSGA as described above.

The first preamble can be a preamble used by the terminal device for random access. The terminal device can select a resource for transmitting the first preamble, and transmit the first preamble on the selected resource. The resource for the first preamble may include at least one of the following resources: a time domain resource, a frequency domain resource, and a code domain resource.

The terminal device can also transmit identification information of the terminal device to the network device.

At S820, the network device transmits scheduling information to the terminal device according to a reception situation of the first uplink data. Accordingly, the terminal device can receive the scheduling information transmitted by the network device.

After the terminal device transmits the first preamble and the first uplink data, the network device can detect the first uplink data transmitted by the terminal device, and the network device may have two reception situations. In a first situation, the network device receives the first preamble, but fails to correctly receive the first uplink data. In a second situation, the network device correctly receives the first preamble and the first uplink data. The situation where the network device does not receive the first preamble will not be considered in the embodiment of the present disclosure. Therefore, the following descriptions are based on the situations in which the network device correctly receives the first preamble.

For the above two different situations, the network device can transmit different scheduling information to the terminal device. For example, if the network device does not correctly receive the first uplink data, the network device can transmit first scheduling information to the terminal device to trigger the terminal device to retransmit the uplink data, and the first scheduling information can indicate the terminal device to transmit the uplink data. In another example, if the network device correctly receives the first uplink data, the network device can transmit second scheduling information and an MSGB to the terminal device, and the second scheduling information can indicate the terminal device to receive downlink data.

There may be two cases where the network device does not correctly receive the first uplink data. In a first case, the network device does not receive the first uplink data, that is, the network device does not detect the first uplink data at all. In a second case, the network device receives the first uplink data, but the network device only receives a part of the first uplink data, rather than all of the first uplink data, or the network device fails to correctly decode the first uplink data, and so on.

After transmitting the MSGA, the terminal device receives the scheduling information transmitted by the network device within a time window. Here, the MSGA may include the first preamble and the first uplink data. The time window may refer to a time period after the terminal device transmits the MSGA. The start of the time window may be later than the payload of MSGA, or the start of the time window may be delayed by N symbols, slots, milliseconds, etc., with respect to a slot in which the payload of the MSGA is transmitted, where N is a positive integer. The duration of the time window can be K symbols, slots, milliseconds, etc., where K is a positive integer. The time window can be similar to the existing RAR time window.

The time window in the embodiment of the present disclosure may be smaller than the RAR time window in the four-step random access procedure, such that the delay in the random access of the terminal device can be reduced.

At S830, after receiving the scheduling information transmitted by the network device, the terminal device performs a subsequent transmission. Accordingly, the network device can also perform a subsequent transmission based on the scheduling information.

The terminal device can perform different transmissions with the network device depending on different types of scheduling information transmitted by the network device. When the terminal device detects that the scheduling information transmitted by the network device is the first scheduling information, it means that the network device has not received the first uplink data correctly, and the terminal device may retransmit the uplink data to the network device. When the terminal device detects that the scheduling information transmitted by the network device is the second scheduling information, it means that the network device has correctly received the first uplink data, and the terminal device can receive an MSGB transmitted by the network device according to a resource position indicated in the second scheduling information, or the terminal device can receive a contention resolution message transmitted by the network device according to a resource position indicated in the second scheduling information.

The uplink data retransmitted by the terminal device to the network device may be the first uplink data or reselected uplink data. If the uplink data retransmitted by the terminal device to the network device is the first uplink data, it means that the terminal device is retransmitting the MSGA. If the uplink data retransmitted by the terminal device to the network device is second uplink data that is different from the first uplink data, it means that the random access procedure of the terminal device falls back to a four-step random access procedure, and the second uplink data transmitted by the terminal device can be understood as an MSG3 in the four-step random access procedure.

Whether the terminal device is to transmit the first uplink data or the second uplink data may be indicated by the network device via certain fields in the scheduling information. Details of such indication will be described below.

Likewise, the network device can also perform different transmissions with the terminal device depending on different scheduling information transmitted to the terminal device. If the scheduling information transmitted by the network device to the terminal device is the first scheduling information, the network device can receive the uplink data transmitted by the terminal device. If the scheduling information transmitted by the network device to the terminal device is the second scheduling information, the network device can transmit an MSGB to the terminal device.

It can be appreciated that the network device may transmit the second scheduling information and the MSGB to the terminal device simultaneously. That is, the network device may transmit the second scheduling information and the MSGB to the terminal device at the same time.

If the terminal device retransmits the first uplink data to the network device, the network device can combine the first uplink data received this time with the first uplink data received previously to improve the reception detection performance and the correct rate of receiving the first uplink data. In addition, the terminal device only needs to transmit the first uplink data, and does not need to transmit the first preamble to the network device as well, which can avoid redundant transmission of the preamble.

Of course, the terminal device may also transmit the first preamble and the first uplink data together to the network device. The preamble has a certain effect of assisting the detection and reception of the first uplink data. For example, the preamble, as a part of a pilot for demodulation, is beneficial to the reception of the first uplink data. Therefore, the transmission of the first preamble can also improve the correct rate of receiving the first uplink data.

The above solution provides a retransmission mechanism for the payload in the MSGA, such that network device can combine more than one transmission of the same payload, improve the Signal to Interference plus Noise Ratio (SINR), improve the probability of correctly detecting the uplink data, reduce the number of retransmissions, and enhance the coverage of the MSGA. Here, the payload in the MSGA can be understood as uplink data.

In the following, schemes for carrying the scheduling information will be described with reference to three cases.

In Case 1, the first scheduling information and the second scheduling information may each be carried on a PDSCH.

For example, the first scheduling information and the second scheduling information may be carried in an RAR on the PDSCH. The format of the RAR can be as shown in FIG. 6. The RAR may be generated at a MAC layer.

For the case where the scheduling information is carried in the RAR, the network device can include all content of the scheduling information in the RAR. For example, information such as a timing advance, an uplink transmission parameter, and information for identifying the terminal device as included in the scheduling information can all be carried in the RAR.

According to the RAR format shown in FIG. 6, the scheduling information being carried in the RAR may mean that the scheduling information is carried in a UL grant.

After transmitting the first preamble and the first uplink data, the terminal device can receive the RAR within a time window. Specifically, the terminal device may receive a PDCCH scrambled with an RA-RNTI within the time window, and obtain a PDSCH scheduled by the PDCCH. The terminal device may detect the PDSCH and transmit Transport Blocks (TBs) in the PDSCH to an upper layer. By analyzing a Random Access Preamble Identity (RAPID) in the RAR on the PDSCH, the terminal device can determine whether the RAR is an RAR for itself. If the RAPID is consistent with the first preamble transmitted by the terminal device, it means the RAR is an RAR for the terminal device. If the RAR is an RAR for the terminal device, the terminal device can read the UL grant, timing advance, temporary C-RNTI and other information in the RAR.

The first scheduling information and the second scheduling information can be carried in the same manner, that is, both are carried in the RAR, which can prevent the terminal device from detecting a plurality of PDCCHs simultaneously. Since one PDCCH may schedule different PDSCHs and different PDSCHs may carry different scheduling information, the terminal device can obtain a plurality of types of scheduling information carried by a plurality of PDSCHs by detecting one single PDCCH.

In this case, information for distinguishing between the first scheduling information and the second scheduling information can be indicated by any bit(s) in the RAR. In other words, the type of scheduling information can be indicated by any bit(s) in the RAR.

Scheme 1: The information for distinguishing between the first scheduling information and the second scheduling information can be indicated by at least one of the followings: a reserved (R) bit in the RAR, a bit indicating the timing advance in the RAR, and a bit indicating the temporary C-RNTI in the RAR.

For the R bit as an example, when R is set to 1, it means that the RAR carries the first scheduling information, and when R is set to 0, it means that the RAR carries the second scheduling information.

Scheme 2: The information for distinguishing between the first scheduling information and the second scheduling information may be indicated by at least one of bits for indicating a UL grant in the RAR.

For example, the current UL grant information can be compressed, and the spared bit can indicate the information for distinguishing between the first scheduling information and the second scheduling information. Typically, the UL grant information can be compressed from the current 27 bits to 26 bits, and the one spared bit can be used for indicating the information for distinguishing between the first scheduling information and the second scheduling information. For convenience of description, the one spared bit can be referred to as a first bit. When the value of the first bit is 1, it means that the RAR carries the first scheduling information; or when the value of the first bit is 0, it means that the RAR carries the second scheduling information.

The bits occupied by each information in the RAR grant field can be as shown in Table 1. Therefore, compressing the UL grant information can be achieved by compressing at least one of the information in Table 1. For example, the information for distinguishing between the first scheduling information and the second scheduling information may be indicated by a spared bit obtained after compressing bits for indicating an MCS in the UL grant. In another example, the information for distinguishing between the first scheduling information and the second scheduling information may be indicated by a spared bit obtained after compressing or deleting bits for indicating a CSI request message in the UL grant.

The information for distinguishing between the first scheduling information and the second scheduling information may be indicated by one or more bits. The embodiment of the present disclosure is not limited to any of these examples. Using one bit to indicate the first scheduling information or the second scheduling information can save signaling overhead.

In Case 2, the first scheduling information may be carried on a PDSCH, and the second scheduling information may be carried on a PDCCH.

Since the first scheduling information and the second scheduling information are carried on different channels, the terminal device can determine whether the received scheduling information is the first scheduling information or the second scheduling information depending on different channels.

The first scheduling information may be carried on the PDSCH, and the PDSCH may be scheduled by a PDCCH having a CRC scrambled with an RA-RNTI. The first scheduling information may be the scheduling information that the network device transmits to the terminal device for the first time after receiving the first preamble transmitted by the terminal device. That is, when the network device transmits the first scheduling information to the terminal device for the first time, the first scheduling information may be carried on the PDSCH for transmitting to the terminal device.

For the first scheduling information that is not transmitted to the terminal device for the first time, the network device may use the PDSCH for carrying the first scheduling information, or may use the PDCCH for carrying the first scheduling information.

The second scheduling information may be carried on the PDCCH. Downlink Control Information (DCI) in the PDCCH may be scrambled with a first RNTI for identifying the terminal device.

The first RNTI may be a C-RNTI, and the C-RNTI may be obtained by the terminal device from scheduling information previously transmitted by the network device. Alternatively, the first RNTI may be determined based on at least one of the resource for the first preamble, the resource for the PUSCH carrying the first uplink data and bearer information in the PUSCH carrying the first uplink data. The resource for the first preamble may include at least one of the following resources: a time domain resource for the first preamble, a frequency domain resource for the first preamble, and a code domain resource for the first preamble. The resource for the PUSCH carrying the first uplink data may include a pilot resource and/or a code domain resource for the PUSCH. The bearer information in the PUSCH carrying the first uplink data includes information for identifying the terminal device as carried on the PUSCH.

Specifically, the first RNTI may be generated according to at least one of the following information: time domain information of the first preamble, frequency domain information of the first preamble, code domain information of the first preamble, pilot information for the PUSCH carrying the first uplink data, code domain information of the PUSCH carrying the first uplink data, and information for identifying the terminal device as carried on the PUSCH carrying the first uplink data.

In Case 3, the first scheduling information and the second scheduling information may each be carried on a PDCCH. For example, the first scheduling information and the second scheduling information may be carried on different PDCCHs.

The scheduling information being carried on the PDCCH may mean that all the scheduling information is carried on the PDCCH, or that a part of the scheduling information is carried on the PDCCH and the other part of the scheduling information is carried on a PDSCH scheduled by the PDCCH.

DCI in the PDCCH may be scrambled with a temporary C-RNTI, or may be scrambled with a first RNTI for identifying the terminal device. For the determination of the first RNTI, reference can be made to the above description.

The first RNTI can be similar to the RNTI specific to the terminal device, and can be used to identify the terminal device to a certain extent.

For scrambling the DCI with the temporary C-RNTI, the first scheduling information carried in the DCI may be the scheduling information transmitted by the network device to the terminal device not for the first time after receiving the first preamble. The terminal device can obtain the temporary C-RNTI from the scheduling information that the network device transmits to the terminal device for the first time.

Of course, the DCI can alternatively be scrambled with an RA-RNTI. In this case, the scheduling information carried on the PDCCH can be the scheduling information that the network device transmits to the terminal device for the first time, or can be the scheduling information that the network device transmits to the terminal device not for the first time. Regardless of whether it is transmitted for the first time or not, the terminal device and the network device can determine the RA-RNTI according to Equation 1, and the terminal device can correctly decode the PDCCH according to the RA-RNTI.

After transmitting the first preamble and the first uplink data, the terminal device may receive the PDCCH transmitted by the network device within a time window. Specifically, the terminal device may receive the PDCCH scrambled with the X-RNTI within the time window, and the X-RNTI here may be the C-RNTI or the first RNTI as described above.

Due to the high flexibility in PDCCH scheduling, appropriate resources, such as time-frequency resources and MCS, can be allocated to the terminal device, to ensure the reliability of data transmission. The terminal device can use appropriate resources for transmission when transmitting the uplink data. Therefore, with the PDCCH carrying the scheduling information, the efficiency of retransmission can be improved.

For Case 3, the information for distinguishing between the first scheduling information and the second scheduling information may be indicated by the RNTI for scrambling the DCI.

Alternatively, the information for distinguishing between the first scheduling information and the second scheduling information may be indicated by at least one of bits for indicating uplink or downlink transmission in the DCI in the PDCCH. The DCI in the PDCCH may include a bit for indicating uplink or downlink transmission, and the information for distinguishing may be indicated by multiplexing the bit. For example, when the bit indicates uplink transmission, it indicates that the DCI is the first scheduling information. When the bit indicates downlink transmission, it indicates that the DCI is the second scheduling information.

Case 3 can be used in combination with Case 1 and Case 2.

For example, if the network device receives the first preamble transmitted by the terminal device, but does not correctly receive the first uplink data, the network device may transmit the first scheduling information to the terminal device. The first scheduling information is the scheduling information that the network device transmits to the terminal device for the first time after receiving the first preamble. The first scheduling information may be carried on the PDSCH, which may be scheduled by the DCI scrambled with the RA-RNTI. Since the terminal device can determine the RA-RNTI, the terminal device can correctly receive the first scheduling information carried on the PDSCH. While transmitting the first scheduling information to the terminal device, the network device may also transmit the C-RNTI to the terminal device. After receiving the first scheduling information, the terminal device may retransmit the uplink data to the network device. If the network device still fails to correctly receive the uplink data retransmitted by the terminal device, the network device may continue to transmit the first scheduling information to the terminal device. The first scheduling information may be carried on the PDCCH. Since the network device has transmitted the C-RNTI to the terminal device last time, in this transmission, the DCI in the PDCCH can be scrambled with the C-RNTI.

Of course, the network device can also include all subsequent scheduling information in the PDCCH.

It can be appreciated that scrambling DCI in the embodiment of the present disclosure can be understood as scrambling CRC in the DCI.

The content in the first scheduling information will be described below.

The first scheduling information may include at least one of the following information:

a timing advance, information for identifying a terminal device, and an uplink transmission parameter.

The timing advance can indicate a timing advance for uplink transmission, which can improve the transmission reliability of the retransmission and reduce the interference with other terminal devices.

The information for identifying the terminal device can be obtained in an explicit or implicit manner. For example, the information for identifying the terminal device may include a preamble resource and/or an X-RNTI.

When the first scheduling information is carried in the RAR, the information for identifying the terminal device may include a preamble resource, which may include at least one of the following resources: a time domain resource, a frequency domain resource, and a code domain resource. Specifically, the preamble resource may include an RAPID. The terminal device can determine whether the RAR is an RAR for itself according to the RAPID information in the RAR.

When the first scheduling information is carried on the PDCCH, the information for identifying the terminal device may include an X-RNTI, which may be used to scramble the DCI in the PDCCH. After receiving the PDCCH, the terminal device can use the X-RNTI to decode the PDCCH. If the terminal device can decode the PDCCH correctly, it means that the PDCCH is for the terminal device; or if the terminal device cannot decode the PDCCH correctly, it means that the PDCCH is not for the terminal device.

The uplink transmission parameter may include at least one of the following information: a time domain resource, a frequency domain resource, a pilot resource, an MCS, power information, New Data Indicator (NDI) information, and Redundancy Version (RV) information.

The NDI can indicate whether the uplink data to be transmitted by the terminal device is a retransmission of the first uplink data. The network device may indicate, via the NDI, that the uplink data to be retransmitted by the terminal device is the first uplink data or is not limited to the first uplink data. For example, when NDI=1, it means that the first uplink data is to be retransmitted. In this case, the terminal device can retransmit the first uplink data to the network device. When NDI=0, it means that the uplink data is not limited to the first uplink data. In this case, the terminal device may reselect uplink data to be transmitted to the network device, or the terminal device may also transmit the first uplink data to the network device.

For convenience of description, the case where the terminal device retransmits the first uplink data may be referred to as a retransmission, and the case where the uplink data transmitted by the terminal device is not limited to the first uplink data is referred to as an initial transmission.

The RV represents an RV version used for the uplink data. For example, when the RV has a value of {0, 1}, the corresponding RV versions are 0 and 3, respectively. In another example, when the RV has a value of {0, 1, 2, 3}, the corresponding RV versions are 0, 2, 3, 1, respectively.

Here, the NDI information and the RV information can be indicated by different bits, or by the same bit(s). For the case where they are indicated by the same bit(s), one implementation is that one bit can indicate both the NDI information and the RV information. For example, when the value of this bit is 1, it means a retransmission and a RV version of 3. When the value of this bit is 0, it means an initial transmission and an RV version of 0. Using the same bit to indicate both the NDI information and the RV information may mean that the original NDI bit can be retained and the RV information can be obtained indirectly from the value of the NDI bit, or that the original RV bit can be retained and the NDI information can be obtained indirectly from the value of the RV bit.

Of course, the embodiment of the present disclosure may alternatively use a plurality of bits to indicate both the NDI information and the RV information. For example, two bits can be used for indicating both the NDI information and the RV information.

Using the same bit(s) to indicate both the NDI information and the RV information can reduce signaling overhead in that the NDI information and RV information can be indicated using fewer bits. Since the NDI information and the RV information require fewer bits, they can be indicated only by the spared bit(s) obtained after compressing the bits in the UL grant, which can avoid using the bits of the timing advance and the temporary C-RNTI, thereby reducing the impact on transmission of the timing advance and the temporary C-RNTI.

The schemes for carrying the information included in the scheduling information for different situations in which the scheduling information is carried will be described below.

For the case where the scheduling information is carried on the PDCCH, all the information included in the scheduling information can be carried on the PDCCH, or part of the information can be carried on the PDCCH and the other part of the information can be carried on the PDSCH scheduled by the PDCCH.

For example, the information for identifying the terminal device and the uplink transmission parameter can be carried on the PDCCH, and the timing advance can be carried in an MAC Control Element (CE) in a subsequent PDSCH. Since the information for identifying the terminal device and the uplink transmission parameter are originally included in the DCI, and the DCI does not include the timing advance, the scheme of carrying the timing advance on the PDSCH has little impact on the existing specification and can reduce the complexity of the terminal.

In another example, the information for identifying the terminal device, the uplink transmission parameter, and the timing advance can all be carried on the PDCCH. In order to keep the size of the DCI format unchanged, the timing advance can be indicated by one or more spared bits obtained after compressing or multiplexing the bits in the existing DCI. The terminal device can obtain the timing advance while obtaining the uplink transmission parameter. After the terminal device obtains the timing advance in time, it can avoid interference with other terminal devices. Therefore, this scheme allows completing the synchronization of the uplink data in time, improving the transmission reliability of the retransmission, and reducing the interference with other users.

The bits in the existing DCI can be multiplexed or compressed in the following two schemes.

1. Multiplexing or compressing the bits in the existing DCI may refer to compressing the bits indicating at least one of the following information: RV information, frequency resource, time domain resource, and HARQ process number. Since the size of the uplink data to be transmitted by the terminal device can be basically determined, the time domain resource and frequency domain resource to be used by the terminal device for transmitting the uplink data can also be basically determined. Therefore, the information of the above time domain resource and frequency domain resource can be compressed to indicate the timing advance. In the case where data transmission has not occurred, that is, in the case of initial access of the terminal device, the HARQ process number for the terminal device is unique, so the HARQ process number can be compressed to indicate the timing advance.

2. At least one bit for at least one of the following information can be multiplexed: NDI information, RV information, and HARQ process number. As described above, since the NDI information and the RV information can be indicated by the same bit(s), one of the NDI information and the RV information can be explicitly indicated and the other one of the NDI information and the RV information can be implicitly indicated, the existing bit(s) for indicating the NDI information and the RV information can be multiplexed for indicating the timing advance. For the HARQ process number, in the case of initial access, the process number for the terminal device is unique and does not need to be indicated. Therefore, the bit(s) for indicating the HARQ process number can be used for indicating the timing advance.

For the case where the scheduling information is carried in the RAR, all the information included in the scheduling information can be carried in the RAR.

FIG. 6 is a schematic diagram showing an RAR format. Table 1 shows the bit occupancy of various information included in the uplink grant information in the existing RAR.

As can be seen from Table 1, the uplink grant information does not include NDI information and RV information.

The NDI information and the RV information may be indicated by bit(s) in the RAR for indicating at least one of the following information: uplink grant information and temporary C-RNTI.

For example, the NDI information and the RV information can be indicated by one or more spared bits obtained after compressing the bits for indicating the time domain resource in the uplink grant information, as shown in Table 3.

TABLE 3

| RAR Grant Field | No. of Bits |
| --- | --- |
| Frequency Hopping | 1 |
| PUSCH Frequency Domain Resource | 14 |
| PUSCH Time Domain Resource | 3 |
| MCS | 4 |
| NDI/RV | 1 |
| TPC Command For PUSCH | 3 |
| CSI Request | 1 |

By comparing Table 1 and Table 3, it can be seen that the PUSCH time domain resource is compressed from the original 4 bits to 3 bits, and the 1 spared bit obtained after the compression can be used for indicating the NDI information and/or the RV information.

Of course, the NDI information and/or the RV information can alternatively be indicated by compressing other information in the uplink grant information.

In another example, the bits for the UL grant and the temporary C-RNTI in the RAR may be used for indicating the NDI information and/or the RV information. For example, the bits for the UL grant and the temporary C-RNTI can be increased to indicate the NDI information and/or the RV information. After the bits are increased, the range that can be indicated by the bits can be increased, which can improve the scheduling flexibility.

Example 1: The bits for the temporary C-RNTI can be increased to indicate the NDI information and/or the RV information. As shown in Table 4, the bits for the temporary C-RNTI can be increased by 3, i.e., the bits for the temporary C-RNTI are increased from the original 13 bits to 16 bits. One of the added bits is used to increase the bits indicating the MCS, and the bits for indicating the MCS is increased from the original 4 bits to 5 bits. Two of the added bits are for indicating the RV information.

TABLE 4

| RAR Grant Field | No. of Bits |
| --- | --- |
| Frequency Hopping | 1 |
| PUSCH Frequency Domain Resource | 14 |
| PUSCH Time Domain Resource | 4 |
| MCS | 5 |
| TPC Command For PUSCH | 3 |
| CSI Request | 1 |
| RV | 2 |
| Padding | 13 |

Example 2: The bits for the temporary C-RNTI can be compressed to indicate the NDI information and/or the RV information. The compressed bits for the temporary C-RNTI can be specified in a protocol or can be notified to the terminal device by the network device. For example, one or more high or low bits of the temporary C-RNTI can be set to a special value. For example, the three highest bits of the temporary C-RNTI can be set to 0 by default, and the spared bits obtained after the compression can be used for indicating the NDI information and/or the RV information, as shown in Table 5.

TABLE 5

| RAR Grant Field | No. of Bits |
| --- | --- |
| Frequency Hopping | 1 |
| PUSCH Frequency Domain Resource | 14 |
| PUSCH Time Domain Resource | 4 |

TABLE 5-continued

| RAR Grant Field | No. of Bits |
| --- | --- |
| MCS | 5 |
| TPC Command For PUSCH | 3 |
| CSI Request | 1 |
| RV | 2 |
| Temporary C-RNTI | 13 |

It can be seen from Table 5 that the number of bits for the temporary C-RNTI can be increased by 3, i.e., the number of C-RNTI bits can be increased from original 13 to 16. One of the added bits can be used to increase the bits indicating the MCS, to increase the indication range of the MSC. Two of the added bits can be used for indicating the RV information.

In a case where the scheduling information is the first scheduling information, the terminal device may determine whether the uplink data to be retransmitted to the network device is the first uplink data based on the NDI information and/or the RV information in the first scheduling information. When at least one of the NDI information and the RV information indicates a retransmission, the terminal device retransmits the first uplink data to the network device. When at least one of the NDI information and the RV information indicates an initial transmission, the terminal device may transmit second uplink data to the network device, and the second uplink data may be the same as the first uplink data or different from the first uplink data.

The retransmission may indicate that the terminal device continues to use the two-step random access procedure for access, and the terminal device needs to retransmit the same data as the first uplink data in the MSGA to the network device.

The initial transmission indicates that the terminal device is to fall back to the four-step random access process, and the uplink data transmitted to the network device may not be limited to the first uplink data. In this case, the terminal device can transmit uplink data based on the first scheduling information transmitted by the network device, and the uplink data transmitted by the terminal device is equivalent to the MSG3 in the four-step random access procedure.

Based on the above description, after the terminal device receives the scheduling information transmitted by the network device, it can perform different transmissions depending on different scheduling information. In one case, the scheduling information received by the terminal device is the second scheduling information, and the terminal device receives the MSGB based on the second scheduling information. In one case, the scheduling information received by the terminal device is the first scheduling information indicating a retransmission, which means that the uplink data to be retransmitted by the terminal device is the first uplink data, and the terminal device may transmit the first uplink data to the network device based on the first scheduling information. If the scheduling information received by the terminal device is the first scheduling information indicating an initial transmission, which means that the uplink data to be retransmitted by the terminal device may not be limited to the first uplink data, the terminal device may transmit second uplink data to the network device, and the second uplink data may be the same as or different from the first uplink data.

The first scheduling information indicates a retransmission or an initial transmission, which may be indicated via the NDI information and/or the RV information.

For the retransmission and the initial transmission, the transport block size and/or power of the uplink data transmitted by the terminal device may be different.

For the transport block size, if it is a retransmission, the transport block size used by the terminal device to transmit the first uplink data is the same as the transport block size used for the last transmission of the first uplink data, regardless of the time domain resource and the frequency domain resource in the first scheduling information. If it is an initial transmission, the transport block size used by the terminal device to transmit the second uplink data may be determined based on at least one of the following information: the time domain resource, the frequency domain resource, and MCS.

For the TPC command, if it is a retransmission, the power used by the terminal device to transmit the first uplink data can be determined based on the TPC command in the first scheduling information and the power used to transmit the first uplink data last time. That is, the TPC command in the first scheduling information is adjustment information relative to the transmit power of the last PUSCH. If it is an initial transmission, the power used by the terminal device to transmit the first uplink data can be determined based on the TPC command in the first scheduling information and the power used to transmit the first preamble last time. That is, the TPC command in the first scheduling information is adjustment information relative to the transmit power of the last preamble. This scheme can use different power adjustment mechanisms adapted to different modes.

Of course, regardless of initial transmission or retransmission, the TPC command in the first scheduling information may be adjustment information relative to the transmit power of the last PUSCH. In this way, a fast accumulation of capability can be achieved.

If the terminal device consecutively receives the first scheduling information for a maximum number of retransmissions without receiving the second scheduling information, the terminal device may choose to reinitiate random access. The maximum number of retransmissions can be configured by the network device, or can be a value specified in a protocol. The maximum number of retransmissions may be 4, for example.

The embodiments of the present disclosure are not limited to any specific procedure of the random access reinitiated by the terminal device. For example, a four-step random access may be initiated to retransmit the random access preamble to the network device. In another example, a two-step random access can alternatively be initiated to transmit the random access preamble and the uplink data to the network device.

For the four-step random access and two-step random access procedures, reference can be made to the above description, and the details thereof will be omitted here.

The wireless communication method according to the embodiment of the present disclosure has been described in detail above. The apparatuses according to embodiments of the present disclosure will be described below in connection with FIG. 9 to FIG. 13. The technical features described in the method embodiment are applicable to the following apparatus embodiments.

Figure 9:
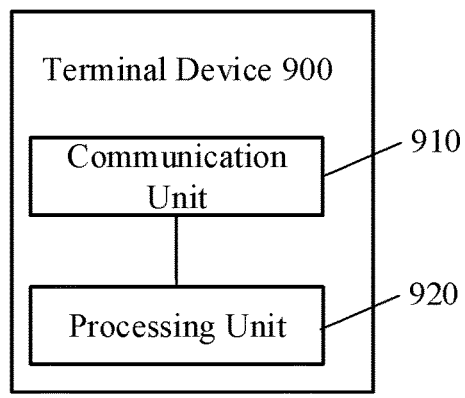
FIG. 9 is a schematic block diagram of a terminal device according to an embodiment of the present disclosure.

FIG. 9 is a schematic block diagram of a terminal device according to an embodiment of the present disclosure. The terminal device 900 in FIG. 9 includes a communication unit 910 and a processing unit 920.

The communication unit 910 is configured to transmit a first preamble and first uplink data to a network device.

The communication unit 910 is further configured to receive scheduling information transmitted by the network device.

The processing unit 920 is configured to perform a subsequent transmission according to the scheduling information.

Optionally, the scheduling information is first scheduling information indicating the terminal device to transmit uplink data or second scheduling information indicating the terminal device to receive downlink data.

Optionally, the communication unit 910 is configured to: retransmit the first uplink data to the network device when the scheduling information is the first scheduling information.

Optionally, the communication unit 910 is further configured to: retransmit the first preamble to the network device.

Optionally, the first scheduling information and the second scheduling information are each carried on a Physical Downlink Shared Channel (PDSCH).

Optionally, the first scheduling information and the second scheduling information are each carried in a Random Access Response (RAR) on the PDSCH.

Optionally, information for distinguishing between the first scheduling information and the second scheduling information is indicated by at least one of the followings: a reserved bit in the RAR, a spared bit obtained after compressing bits for indicating a timing advance, and a spared bit obtained after compressing bits for indicating a temporary Cell Radio Network Temporary Identifier (C-RNTI) in the RAR.

Optionally, the information for distinguishing between the first scheduling information and the second scheduling information is indicated by at least one of bits for indicating uplink grant information in the RAR.

Optionally, the information for distinguishing between the first scheduling information and the second scheduling information is indicated by a spared bit obtained after compressing bits for indicating a Modulation and Coding Scheme (MCS) in the uplink grant information.

Optionally, the information for distinguishing between the first scheduling information and the second scheduling information is indicated by multiplexing a bit for indicating a Channel State Information (CSI) request message in the uplink grant information.

Optionally, the first scheduling information is carried on the PDSCH, and the second scheduling information is carried on a Physical Downlink Control Channel (PDCCH).

Optionally, the PDSCH is scheduled by Downlink Control Information (DCI) scrambled with a Random Access Radio Network Temporary Identifier (RA-RNTI).

Optionally, the DCI in the PDCCH is scrambled with a first RNTI for identifying the terminal device.

Optionally, the first scheduling information is scheduling information that is transmitted to the terminal device for the first time after the network device receives the first preamble.

Optionally, the first scheduling information and the second scheduling information are each carried on a PDCCH.

Optionally, information for distinguishing between the first scheduling information and the second scheduling information is indicated by an RNTI for scrambling DCI carried in the PDCCH.

Optionally, information for distinguishing between the first scheduling information and the second scheduling information is indicated by at least one of bits for indicating uplink or downlink transmission in DCI in the PDCCH.

Optionally, the first scheduling information is scheduling information that is transmitted to the terminal device not for the first time after the network device receives the first preamble.

Optionally, the PDCCH is scrambled with a temporary Cell Radio Network Temporary identifier (C-RNTI), and the temporary C-RNTI is obtained from first scheduling information that is transmitted by the network device to the terminal device for the first time.

Optionally, the first scheduling information includes at least one of the following information: a timing advance, information for identifying the terminal device, and an uplink transmission parameter.

Optionally, the uplink transmission parameter includes at least one of the following information: a time domain resource, a frequency domain resource, a pilot resource, an MCS, power information, New Data Indicator (NDI) information, and Redundancy Version (RV) information.

Optionally, the NDI information and the RV information are indicated by a same bit.

Optionally, the first scheduling information is carried on a PDCCH, the information for identifying the terminal device and the uplink transmission parameter are carried on the PDCCH, and the timing advance is carried on a PDSCH scheduled by the PDCCH.

Optionally, the first scheduling information is carried on the PDCCH, the information for identifying the terminal device, the uplink transmission parameter, and the timing advance are all carried on the PDCCH.

Optionally, the timing advance is indicated by one or more spared bits obtained after compressing bits for indicating at least one of the following information: the NDI information, the RV information, the frequency domain resource, the time domain resource, and a Hybrid Automatic Repeat reQuest (HARD) process number.

Optionally, the first scheduling information is carried in the RAR, and the NDI information and the RV information are indicated by one or more spared bits obtained after compressing bits for indicating uplink grant information and/or temporary C-RNTI information in the RAR.

Optionally, the NDI information and the RV information are indicated by one or more spared bits obtained after compressing bits for indicating the time domain resources in the uplink grant information.

Optionally, the information for identifying the terminal device includes at least one of the following information: a preamble resource and a first RNTI.

Optionally, the first scheduling information is carried in the RAR, and the information for identifying the terminal device includes the preamble resource.

Optionally, the preamble resource includes a Random Access Preamble Identity (RAPID).

Optionally, the first scheduling information is carried on a PDCCH, and the information for identifying the terminal device is indicated by the first RNTI for scrambling DCI carried on the PDCCH.

Optionally, the terminal device further includes a processing unit configured to: determine, when the scheduling information is the first scheduling information, whether uplink data to be retransmitted to the network device is the first uplink data based on RV information and/or NDI information in the first scheduling information.

Optionally, when at least one of the RV information and NDI information indicates that the uplink data to be retransmitted by the terminal device to the network device is the first uplink data, a transport block size to be used by the terminal device to retransmit the first uplink data to the network device is same as that used by the terminal device to transmit the first uplink data to the network device for the first time, or when at least one of the RV information and the NDI information indicates that the uplink data to be retransmitted by the terminal device to the network device is not limited to the first uplink data, a resource block size to be used by the terminal device to retransmit the uplink data to the network device is determined based on at least one of a time domain resource, a frequency domain resource, and an MCS in the first scheduling information.

Optionally, when at least one of the RV information and NDI information indicates that the uplink data to be retransmitted by the terminal device to the network device is the first uplink data, power used by the terminal device to retransmit the first uplink data to the network device is determined based on Transmit Power Control (TPC) information in the first scheduling information and power used last time by the terminal device to transmit the first uplink data to the network device, or when at least one of the RV information and the NDI information indicates that the uplink data to be retransmitted by the terminal device to the network device is not limited to the first uplink data, power used by the terminal device to retransmit the uplink data to the network device is determined based on TPC information in the first scheduling information and power used last time by the terminal device to transmit the first preamble to the network device.

Optionally, the communication unit 910 is configured to: reinitiate random access when the scheduling information is the first scheduling information and a number of times that the terminal device consecutively receives the first scheduling information reaches a maximum number of retransmissions.

Optionally, the maximum number of retransmissions is configured by the network device, or is specified in a protocol.

Optionally, the maximum number of retransmissions has a value of 4.

Optionally, the communication unit 910 is configured to: retransmit a random access preamble and uplink data to the network device, or retransmit a random access preamble to the network device.

It can be appreciated that the terminal device 900 can perform the corresponding operations performed by the terminal device in the above method, and for the sake of brevity, details thereof will be omitted here.

Figure 10:
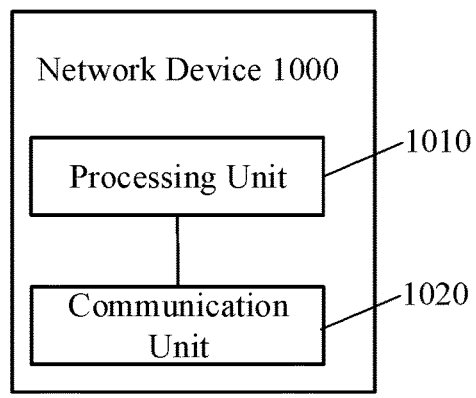
FIG. 10 is a schematic block diagram of a network device according to an embodiment of the present disclosure.

FIG. 10 is a schematic block diagram of a network device according to an embodiment of the present disclosure. The network device 1000 shown in FIG. 10 includes a processing unit 1010 and a communication unit 1020.

The processing unit 1010 is configured to detect a first preamble and first uplink data transmitted by a terminal device.

The communication unit 1020 is configured to transmit scheduling information to the terminal device according to a reception situation of the first uplink data.

The communication unit 1020 is further configured to perform a subsequent transmission according to the scheduling information.

Optionally, the scheduling information is first scheduling information indicating the terminal device to transmit uplink data or second scheduling information indicating the terminal device to receive downlink data.

Optionally, the communication unit 1020 is configured to: transmit the first scheduling information to the terminal device when the first uplink data has not been correctly received; and receive the first uplink data retransmitted by the terminal device according to the scheduling information Optionally, the communication unit 1020 is further configured to: receive the first preamble transmitted by the terminal device.

Optionally, the first scheduling information and the second scheduling information are each carried on a Physical Downlink Shared Channel (PDSCH).

Optionally, the first scheduling information and the second scheduling information are each carried in a Random Access Response (RAR) on the PDSCH.

Optionally, information for distinguishing between the first scheduling information and the second scheduling information is indicated by at least one of the followings: a reserved bit, a spared bit obtained after compressing bits for indicating a timing advance, and a spared bit obtained after compressing bits for indicating a temporary Cell Radio Network Temporary Identifier (C-RNTI) in the RAR.

Optionally, information for distinguishing between the first scheduling information and the second scheduling information is indicated by at least one of bits for indicating uplink grant information in the RAR.

Optionally, the information for distinguishing between the first scheduling information and the second scheduling information is indicated by a spared bit obtained after compressing bits for indicating a Modulation and Coding Scheme (MC S) in the uplink grant information.

Optionally, the information for distinguishing between the first scheduling information and the second scheduling information is indicated by multiplexing a bit for indicating a Channel State Information (CSI) request message in the uplink grant information.

Optionally, the first scheduling information is carried on the PDSCH, and the second scheduling information is carried on a Physical Downlink Control Channel (PDCCH).

Optionally, the PDSCH is scheduled by Downlink Control Information (DCI) scrambled with a Random Access Radio Network Temporary Identifier (RA-RNTI).

Optionally, the DCI in the PDCCH is scrambled with a first RNTI for identifying the terminal device.

Optionally, the first scheduling information is scheduling information that is transmitted to the terminal device for the first time after the network device receives the first preamble.

Optionally, the first scheduling information and the second scheduling information are each carried on a PDCCH.

Optionally, information for distinguishing between the first scheduling information and the second scheduling information is indicated by an RNTI for scrambling DCI carried in the PDCCH.

Optionally, information for distinguishing between the first scheduling information and the second scheduling information is indicated by at least one of bits for indicating uplink or downlink transmission in DCI in the PDCCH.

Optionally, the first scheduling information is scheduling information that is transmitted to the terminal device not for the first time after the network device receives the first preamble.

Optionally, the PDCCH is scrambled with a temporary Cell Radio Network Temporary identifier (C-RNTI), and the temporary C-RNTI is obtained from first scheduling information that is transmitted by the network device to the terminal device for the first time.

Optionally, the first scheduling information includes at least one of the following information: a timing advance, information for identifying the terminal device, and an uplink transmission parameter.

Optionally, the uplink transmission parameter includes at least one of the following information: a time domain resource, a frequency domain resource, a pilot resource, an MCS, power information, New Data Indicator (NDI) information, and Redundancy Version (RV) information.

Optionally, the NDI information and the RV information are indicated by a same bit.

Optionally, the first scheduling information is carried on a PDCCH, the information for identifying the terminal device and the uplink transmission parameter are carried on the PDCCH, and the timing advance is carried on a PDSCH scheduled by the PDCCH.

Optionally, the first scheduling information is carried on the PDCCH, and the information for identifying the terminal device, the uplink transmission parameter, and the timing advance are all carried on the PDCCH.

Optionally, the timing advance is indicated by one or more spared bits obtained after compressing bits for indicating at least one of the following information: the NDI information, the RV information, the frequency domain resource, the time domain resource, and a Hybrid Automatic Repeat reQuest (HARQ) process number.

Optionally, the first scheduling information is carried in the RAR, and the NDI information and the RV information are indicated by one or more spared bits obtained after compressing bits for indicating uplink grant information and/or temporary C-RNTI information in the RAR.

Optionally, the NDI information and the RV information are indicated by one or more spared bits obtained after compressing bits for indicating the time domain resources in the uplink grant information.

Optionally, the information for identifying the terminal device includes at least one of the following information: a preamble resource and a first RNTI.

Optionally, the first scheduling information is carried in the RAR, and the information for identifying the terminal device includes the preamble resource.

Optionally, the preamble resource includes a Random Access Preamble Identity (RAPID).

Optionally, the first scheduling information is carried on a PDCCH, and the information for identifying the terminal device is indicated by the first RNTI for scrambling DCI carried on the PDCCH.

Optionally, the first scheduling information includes RV information and/or NDI information, and at least one of the RV information and NDI information indicates whether uplink data to be retransmitted by the terminal device to the network device is the first uplink data.

Optionally, when at least one of the RV information and NDI information indicates that the uplink data to be retransmitted by the terminal device to the network device is the first uplink data, a transport block size to be used by the terminal device to retransmit the first uplink data to the network device is same as that used by the terminal device to transmit the first uplink data to the network device for the first time, or when at least one of the RV information and the NDI information indicates that the uplink data to be retransmitted by the terminal device to the network device is not limited to the first uplink data, a resource block size to be used by the terminal device to retransmit the uplink data to the network device is determined based on at least one of a time domain resource, a frequency domain resource, and an MCS in the first scheduling information.

Optionally, when at least one of the RV information and NDI information indicates that the uplink data to be retransmitted by the terminal device to the network device is the first uplink data, power used by the terminal device to retransmit the first uplink data to the network device is determined based on Transmit Power Control (TPC) information in the first scheduling information and power used last time by the terminal device to transmit the first uplink data to the network device, or when at least one of the RV information and the NDI information indicates that the uplink data to be retransmitted by the terminal device to the network device is not limited to the first uplink data, power used by the terminal device to retransmit the uplink data to the network device is determined based on TPC information in the first scheduling information and power used last time by the terminal device to transmit the first preamble to the network device.

Optionally, the communication unit 1020 is configured to: receive random access reinitiated by the terminal device when the scheduling information is the first scheduling information and a number of times that the network device consecutively transmits the first scheduling information reaches a maximum number of retransmissions.

Optionally, the maximum number of retransmissions is specified in a protocol.

Optionally, the maximum number of retransmissions has a value of 4.

Optionally, the communication unit 1020 is configured to: receive a random access preamble and uplink data retransmitted by the terminal device, or receive a random access preamble retransmitted by the terminal device.

Figure 11:
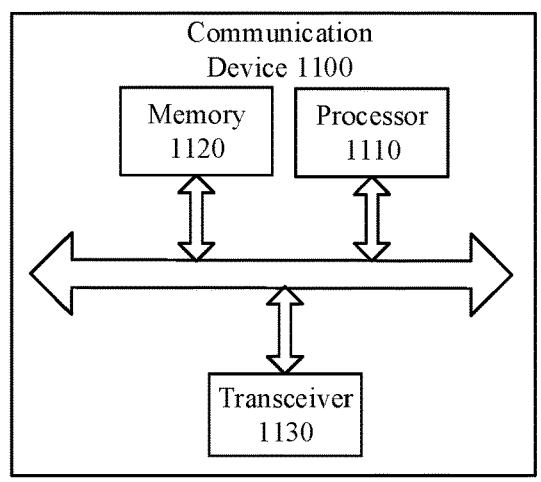
FIG. 11 is a schematic diagram showing a structure of a communication device according to an embodiment of the present disclosure.

FIG. 11 is a schematic diagram showing a structure of a communication device 1100 according to an embodiment of the present disclosure. The communication device 1100 shown in FIG. 11 includes a processor 1110, and the processor 1110 can invoke and execute a computer program from a memory to perform the method according to any of the embodiments of the present disclosure.

Optionally, as shown in FIG. 11, the communication device 1100 may further include a memory 1120. The processor 1110 can invoke and execute a computer program from the memory 1120 to perform the method according to any of the embodiments of the present disclosure.

Here, the memory 1120 may be a separate device independent of the processor 1110, or may be integrated in the processor 1110.

Optionally, as shown in FIG. 11, the communication device 1100 may further include a transceiver 1130. The processor 1110 can control the transceiver 1130 to communicate with other devices, and in particular to transmit information or data to other devices or receive information or data transmitted by other devices.

Here, the transceiver 1130 may include a transmitter and a receiver. The transceiver 1130 may further include one or more antennas.

Optionally, the communication device 1100 may be the network device in the embodiment of the present disclosure, and the communication device 1100 can perform corresponding procedures implemented by the network device in the method according to any of the embodiments of the present disclosure. Details thereof will be omitted here for simplicity.

Optionally, the communication device 1100 may be the mobile terminal/terminal device in the embodiment of the present disclosure, and the communication device 1100 can perform corresponding procedures implemented by the mobile terminal/terminal device in the method according to any of the embodiments of the present disclosure. Details thereof will be omitted here for simplicity.

Figure 12:
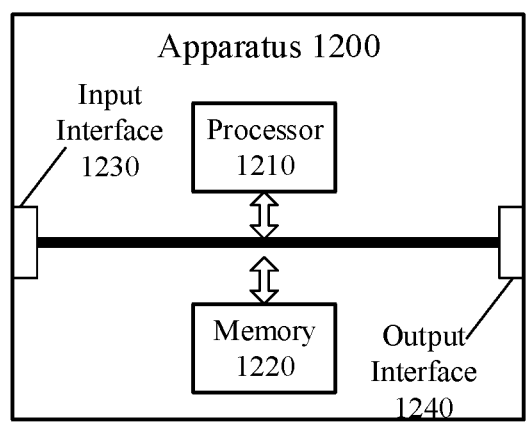
FIG. 12 is a schematic diagram showing a structure of an apparatus according to an embodiment of the present disclosure.

FIG. 12 is a schematic diagram showing a structure of an apparatus according to an embodiment of the present disclosure. The apparatus 1200 shown in FIG. 12 includes a processor 1210, and the processor 1210 can invoke and execute a computer program from a memory to implement the method in the embodiment of the present disclosure.

Optionally, as shown in FIG. 12, the apparatus 1200 may further include a memory 1220. The processor 1210 can invoke and execute a computer program from the memory 1220 to implement the method in the embodiment of the present disclosure.

Here, the memory 1220 may be a separate device independent from the processor 1210, or may be integrated in the processor 1210.

Optionally, the apparatus 1200 may further include an input interface 1230. The processor 1210 can control the input interface 1230 to communicate with other devices or chips, and in particular, obtain information or data transmitted by other devices or chips.

Optionally, the apparatus 1200 may further include an output interface 1240. The processor 1210 can control the output interface 1240 to communicate with other devices or chips, and in particular, to output information or data to other devices or chips.

Optionally, the apparatus can be applied to the network device in the embodiment of the present disclosure, and the apparatus can implement the corresponding procedures implemented by the network device in the various methods of the embodiments of the present disclosure. For the sake of brevity, details thereof will be omitted here.

Optionally, the apparatus can be applied to the mobile terminal/terminal device in the embodiment of the present disclosure, and the apparatus can implement the corresponding procedures implemented by the mobile terminal/terminal device in each method of the embodiment of the present disclosure. For the sake of brevity, details thereof will be omitted here.

It can be appreciated that the apparatus 1200 in the embodiment of the present disclosure may be a chip, and the chip may also be referred to as a system-level chip, a system-chip, a chip system, or a system-on-chip.

Figure 13:
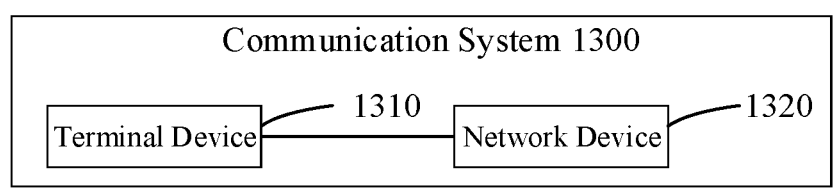
FIG. 13 is a schematic block diagram of a communication system according to an embodiment of the present disclosure.

FIG. 13 is a schematic block diagram of a communication system 1300 according to an embodiment of the present disclosure. As shown in FIG. 13, the communication system 1300 includes a terminal device 1310 and a network device 1320.

Here, the terminal device 1310 can be configured to implement the corresponding functions implemented by the terminal device in the above method, and the network device 1320 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A method for two-step random access procedure, comprising:
    transmitting, by a terminal device, a first preamble and first uplink data to a network device;
    receiving, by the terminal device, scheduling information transmitted by the network device; and
    performing, by the terminal device, a subsequent transmission or reception according to the scheduling information,
    wherein the scheduling information is first scheduling information that is carried on a Physical Downlink Shared Channel (PDSCH) and that indicates the terminal device to retransmit the first uplink data to the network device, and the performing, by the terminal device, the subsequent transmission or reception according to the scheduling information comprises:
    retransmitting, by the terminal device, the first uplink data to the network device; wherein the first scheduling information comprises an uplink transmission parameter, wherein the uplink transmission parameter comprises a modulation and coding scheme (MCS) and power information.

2. The method according to claim 1, wherein the first scheduling information is carried in a Random Access Response (RAR) on the PDSCH.

3. The method according to claim 1, wherein cyclic redundancy check (CRC) for Downlink Control Information (DCI) in the PDCCH is scrambled with a first Radio Network Temporary Identifier (RNTI) for identifying the terminal device.

4. The method according to claim 1, wherein the first scheduling information is scheduling information that is transmitted to the terminal device for the first time after the network device receives the first preamble; and
    for the first scheduling information that is not transmitted to the terminal device for the first time, the first scheduling information is carried on a Physical Downlink Control Channel (PDCCH).

5. The method according to claim 1, wherein the first scheduling information further comprises a timing advance,
the uplink transmission parameter further comprises at least one of the following information: a time domain resource, a frequency domain resource, a pilot resource, New Data Indicator (NDI) information, and Redundancy Version (RV) information.

6. The method according to claim 1, wherein the performing, by the terminal device, the subsequent transmission or reception according to the scheduling information comprises:
reinitiating, by the terminal device, random access when the scheduling information is first scheduling information and a number of times that the terminal device consecutively receives the first scheduling information reaches a maximum number of retransmissions.

7. The method according to claim 1, wherein a resource of the first preamble comprises at least one of the following resources: a time domain resource, a frequency domain resource, or a code domain resource; and
the first uplink data comprises a radio resource control (RRC) connection request message or an RRC connection reestablishment request message.

8. The method according to claim 1, wherein receiving the scheduling information transmitted by the network device, comprises:
receiving the scheduling information transmitted by the network device in a time window, wherein start of the time window is later than the first uplink data, and duration of the time window is K symbols, wherein K is a positive integer.

9. The method according to claim 1, wherein the first scheduling information further comprises information for identifying the terminal device.

10. A network device, comprising a processor and a memory, wherein the memory is configured to store a computer program, and the processor is configured to invoke and execute the computer program stored in the memory to:
detect a first preamble and first uplink data transmitted by a terminal device;
transmit scheduling information to the terminal device according to a reception situation of the first uplink data; and
perform a subsequent transmission or reception according to the scheduling information,
wherein the scheduling information is first scheduling information that is carried on a Physical Downlink Shared Channel (PDSCH) and that indicates the terminal device to retransmit the first uplink data to the network device, and the processor is configured to invoke and execute the computer program stored in the memory to receive the first uplink data retransmitted by the terminal device according to the scheduling information, wherein the first scheduling information comprises an uplink transmission parameter, wherein the uplink transmission parameter comprises a modulation and coding scheme (MCS) and power information.

11. The network device according to claim 10, wherein the processor is configured to invoke and execute the computer program stored in the memory to transmit the first scheduling information to the terminal device when the first uplink data has not been correctly received.

12. The network device according to claim 10, wherein the first scheduling information is carried in a Random Access Response (RAR) on the PDSCH.

13. The network device according to claim 10, wherein cyclic redundancy check (CRC) for Downlink Control Information (DCI) in the PDCCH is scrambled with a first Radio Network Temporary Identifier (RNTI) for identifying the terminal device.

14. The network device according to claim 10, wherein the first scheduling information is scheduling information that is transmitted to the terminal device for the first time after the network device receives the first preamble; and
for the first scheduling information that is not transmitted to the terminal device for the first time, the first scheduling information is carried on a Physical Downlink Control Channel (PDCCH).

15. The network device according to claim 10, wherein the first scheduling information further comprises a timing advance; and
the uplink transmission parameter further comprises at least one of the following information: a time domain resource, a frequency domain resource, a pilot resource, New Data Indicator (NDI) information, and Redundancy Version (RV) information.

16. The network device according to claim 10, wherein a resource of the first preamble comprises at least one of the following resources: a time domain resource, a frequency domain resource, or a code domain resource; and
the first uplink data comprises a radio resource control (RRC) connection request message or an RRC connection reestablishment request message.

17. A terminal device, comprising a processor and a memory, wherein the memory is configured to store a computer program, and the processor is configured to invoke and execute the computer program stored in the memory to:
transmit a first preamble and first uplink data which is carried on a Physical Uplink Shared Channel (PUSCH) to a network device, the PUSCH further carrying a Radio Network Temporary Identifier (RNTI) specific to the terminal device;
receive scheduling information transmitted by the network device; and
perform a subsequent transmission or reception according to the scheduling information,
wherein the scheduling information is second scheduling information that is carried on a Physical Downlink Control Channel (PDCCH) and that indicates the terminal device to receive downlink data, and cyclic redundancy check (CRC) for Downlink Control Information (DCI) in the PDCCH is scrambled with a first RNTI for identifying the terminal device.

18. The terminal device according to claim 17, wherein the first RNTI is generated according to at least one of the following information: time domain information of the first preamble, frequency domain information of the first preamble, code domain information of the first preamble, pilot information for PUSCH carrying the first uplink data, or code domain information of the PUSCH carrying the first uplink data.

19. The terminal device according to claim 18, wherein the processor is configured to invoke and execute the computer program stored in the memory to receive a contention resolution message transmitted by the network device according to a resource position indicated in the second scheduling information.

20. The terminal device according to claim 17, wherein the first RNTI is a RNTI carried in the PUSCH.

* * * * *